Patented Oct. 8, 1929

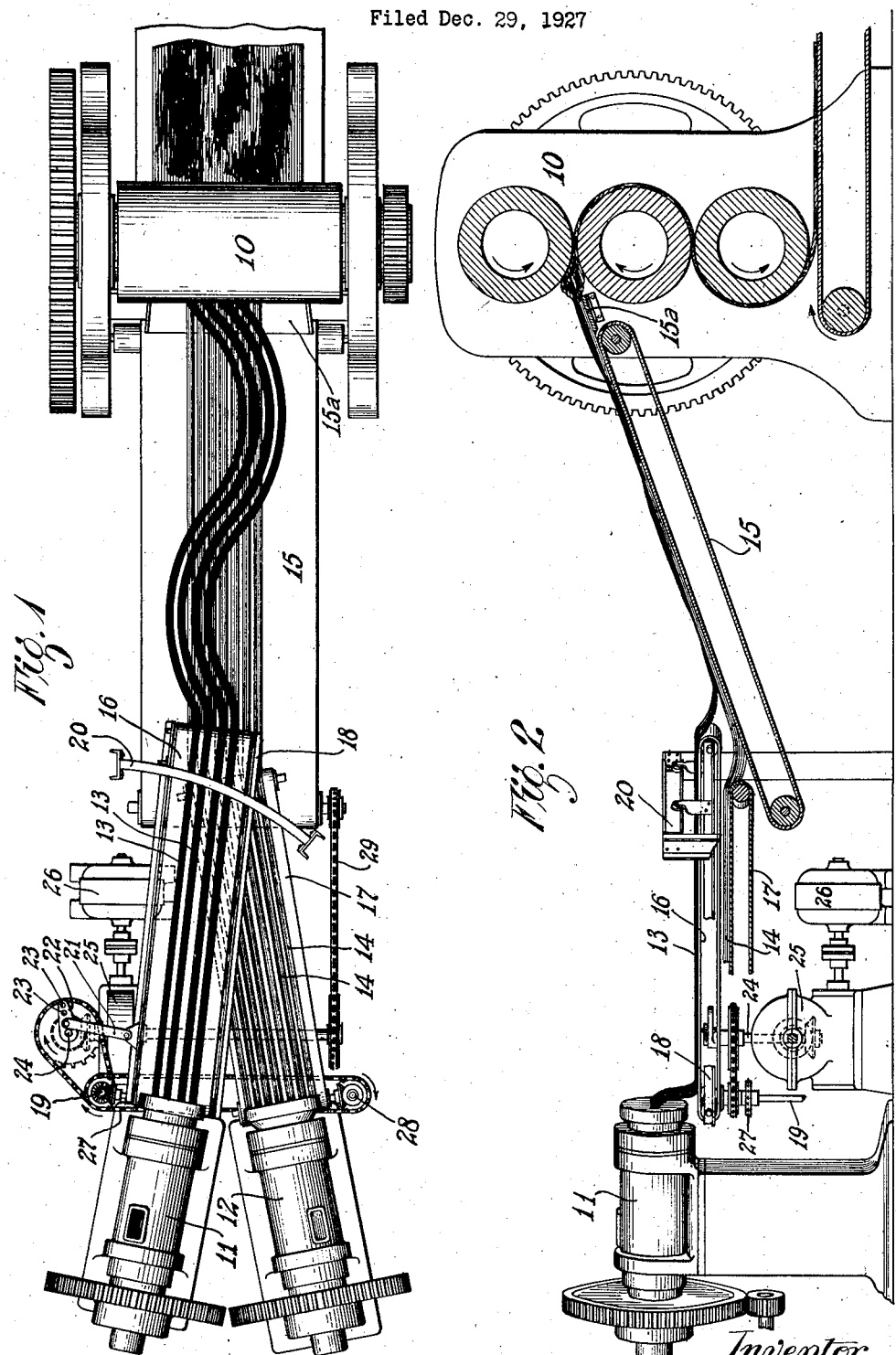

1,730,673

UNITED STATES PATENT OFFICE

TOD J. MELL, OF AKRON, OHIO, ASSIGNOR TO THE B. F. GOODRICH COMPANY, OF NEW YORK, N. Y., A CORPORATION OF NEW YORK

METHOD AND APPARATUS FOR PRODUCING A VARIEGATED PLASTIC SHEET

Application filed December 29, 1927. Serial No. 243,364.

This invention relates to methods and apparatus for producing a variegated sheet of plastic stock such as a rubber composition, for example, and is especially valuable in producing a sheet adapted to be sliced into a plurality of thinner sheets, either before or after vulcanization, as described in my United States Patent No. 1,588,797, granted June 15, 1926.

The chief objects of the present invention are to provide a sheet comprising stocks of different colors mixed in a manner such as to give a pleasing or otherwise distinctive color design upon the surfaces of the thinner sheets sliced from the thick stock sheet; and to provide convenient and economical procedure and apparatus for feeding a calender in such manner as to produce a sheet of desired characteristics.

Of the accompanying drawings:

Fig. 1 is a plan view of apparatus embodying and adapted to carry out my invention in its preferred form.

Fig. 2 is a longitudinal, vertical section of the same.

Referring to the drawings, the apparatus comprises a calender 10 and two extruding machines 11, 12 mounted with their delivery nozzles close together, the machine 11 being provided with a die adapted to deliver a plurality of strips of stock 13, 13 and the machine 12 being adapted to deliver a plurality of strips of stock 14, 14, which may be of a different color or colors from the color or colors of the strips 13.

Means comprising an endless-belt conveyor 15 is provided for feeding the two sets of strips to the calender, over a table member 15ª, and respective endless-belt conveyors 16, 17 are provided for receiving the sets of strips from the extruding machines and delivering them onto the conveyor 15.

Preferably provision is made for automatically associating the two sets of strips with each other in determinate, non-parallel relation in passing them onto the conveyor 15, as by mounting the conveyor 17 in fixed relation to the conveyor 15 and mounting the conveyor 16 upon a frame 18 pivoted upon the upper end of a vertical drive shaft 19 near the extruding machine 11 and geared to the adjacent end roll of the conveyor 16 and supporting the other end of the frame 18 from an arcuate over-head track 20 concentric with the shaft 19.

For oscillating the conveyor 16 to cause the strips 13 to assume a sinuous form upon the straight strips 14 carried upon the conveyor 15 the frame 18 is connected by a link 21 with a crank 22, provided with different crank-pin holes 23, 23 and secured upon the upper end of a vertical shaft 24 having connection through a reduction gear 25 with a drive motor 26.

The drive for the conveyor 17 comprises a sprocket chain 27 operatively connecting the vertical shaft 19 with a vertical shaft 28 geared to the adjacent end roll of the conveyor 17 and the conveyor 15 is driven from the reduction gear 25 through a sprocket chain 29.

In the operation of the apparatus to produce a variegated sheet stocks of different colors are passed through the extruding machines 11 and 12, respectively, the resulting strips 13 and 14 being delivered onto the respective conveyors 16 and 17 and passed by them onto the conveyor 15, where the strips 13 are received on top of the strips 14. The oscillation of the conveyor 16 causes the strips 13 to assume a determinate sinuous form, and two associated sets of strips are delivered to the calender 10 by the conveyor 15 in determinate association. The extruding machines and conveyors preferably are run in such timed relation to the speed of the calender as to avoid an excessively large bank of stock in the calender such as would result in a very thorough intermingling of the two stocks and spoil the design effect of the determinate association of the sets of strips.

In consequence of the manner in which the stocks are fed into the calender the stock sheet 30 issuing from the calender has mixed-color characteristics which do not greatly vary along the sheet and which to some extent are regular and determinate but which nevertheless have a considerable element of chance arrangement, as in the case of marbling and wood-graining effects, which may be obtained by the practice of this invention.

A sheet of desirable color characteristics is thus obtained and with economy of labor and facility and uniformity of operation.

Variations of color effects and of design may be had by feeding the two sets of strips to the calender at different temperatures.

Modifications are possible within the scope of my invention as defined by the appended claims.

I claim:

1. The method of producing a variegated sheet of plastic material which comprises forming the stock in strips by extrusion, superposing some of the strips upon the others while disposing the superposed strips in non-parallel relation to the said other strips, and progressively uniting the strips in a sheet by rolling pressure as they are formed.

2. The method of producing a variegated sheet of plastic material which comprises simultaneously forming strips of different colors by extrusion of the material, continuously feeding into non-parallel association with each other at least some of the strips as they are so formed, and progressively sheeting the stock of the associated strips.

3. The method of producing a sheet of plastic material which comprises longitudinally feeding a set of strips of plastic material while feeding thereonto in determinate, non-parallel relation thereto a second set of strips of plastic material having different color characteristics from those of the first set, and progressively sheeting the stock of the combined sets of strips.

4. Apparatus for producing a sheet of plastic material, the said apparatus comprising a pair of sheeting rolls and means for simultaneously feeding a plurality of strips of plastic stock to said rolls, and means for forming at least one of the strips in sinuous curves and disposing it in that form in contact with the other strips.

5. Apparatus for producing a sheet of plastic material, the said apparatus comprising a pair of sheeting rolls, means for simultaneously forming a plurality of continuous strips of plastic material by extrusion, means for continuously feeding the strips from the forming means to the sheeting rolls, and means associated with the extruding means for disposing some of the strips in sinuous form in contact with the other strips while they are being fed to the sheeting rolls.

6. Apparatus for producing a sheet of plastic material, the said apparatus comprising a pair of sheeting rolls, means for simultaneously forming a plurality of continuous strips of plastic material by extrusion and means for continuously feeding the strips from the forming means to the sheeting rolls and for associating one strip with another in non-parallel relation thereto as they are so fed.

7. Apparatus for producing a sheet of plastic material, the said apparatus comprising a pair of sheeting rolls, a conveyor for continuously delivering strips of plastic stock thereto, a plurality of extruding machines for forming the strips, and respective conveyors for delivering the strips from the extruding machines onto the first said conveyor, and means for passing strips from the extruding machines onto the conveyor in non-parallel relation to each other.

8. The method of producing a variegated sheet of plastic material which comprises simultaneously feeding a plurality of continuous strips of material of different colors and at different temperatures into a mass while constantly varying their relationship to each other, and at the same time sheeting out stock from the mass by rolling pressure.

In witness whereof I have hereunto set my hand this 23rd day of December, 1927.

TOD J. MELL.